(No Model.) 2 Sheets—Sheet 1.
T. HINES.
COMBINED PLANTER AND CULTIVATOR.
No. 247,563. Patented Sept. 27, 1881.
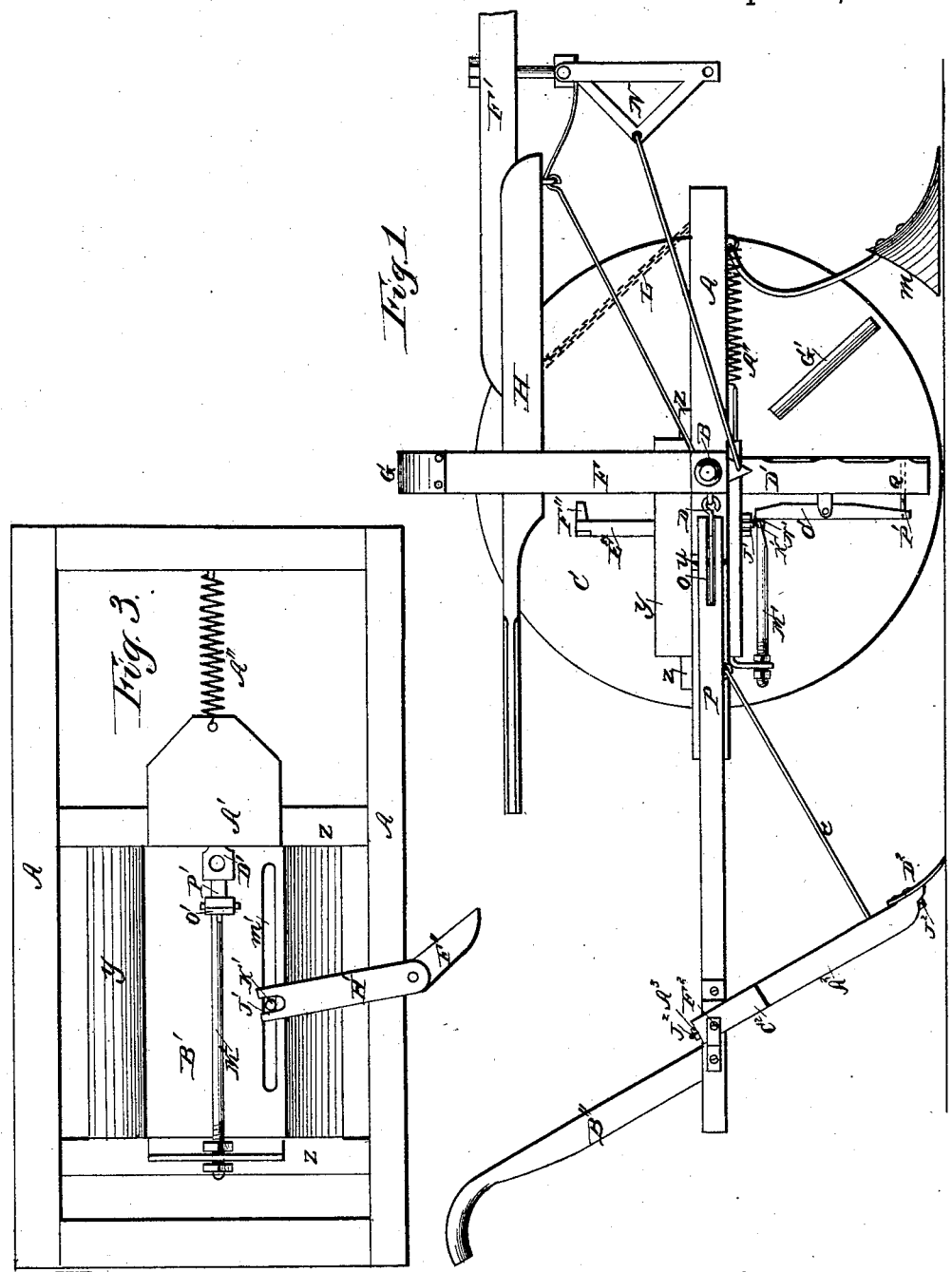
Witnesses:
W. C. McArthur.
Albert L. Lawrence.
Inventor
Thaddeus Hines.
per
Leggett & Leggett
Attorneys

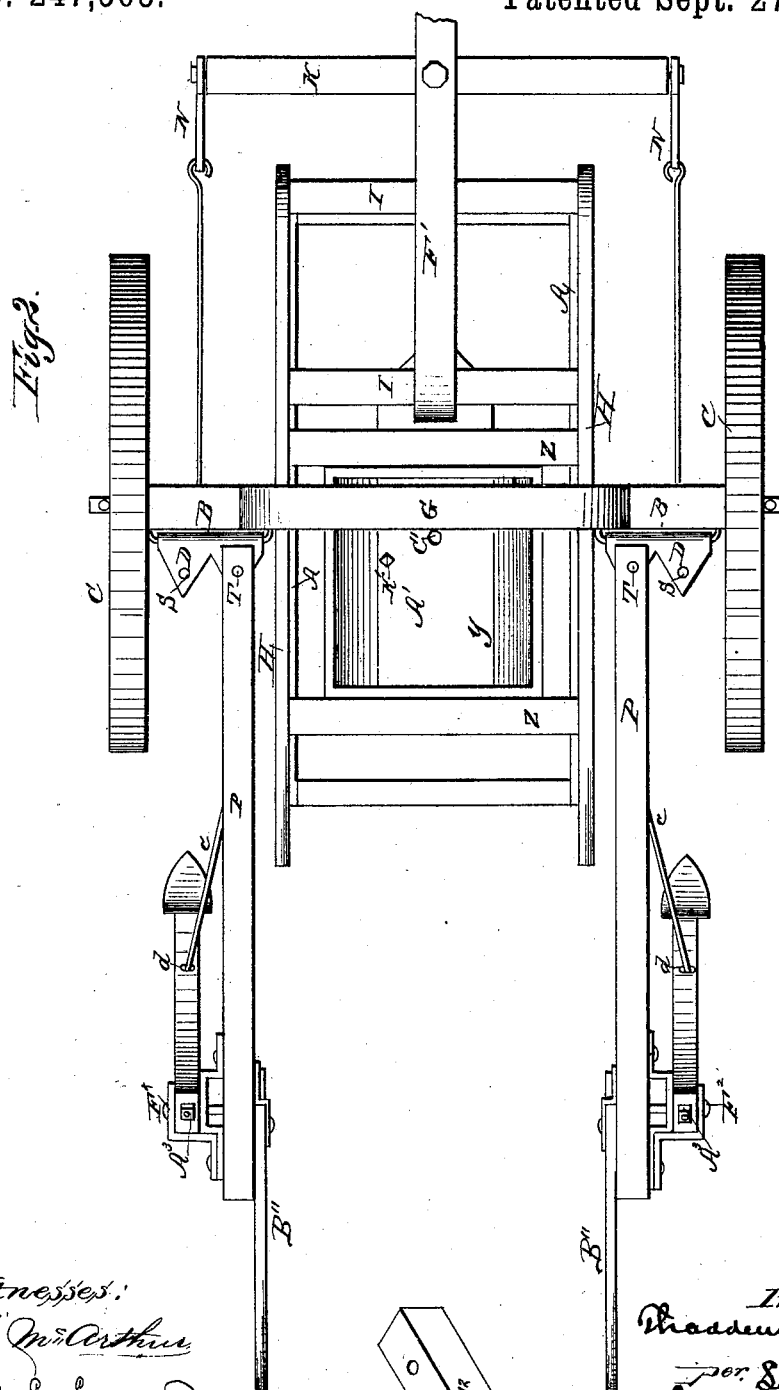

UNITED STATES PATENT OFFICE.

THADDEUS HINES, OF TAMA CITY, IOWA, ASSIGNOR OF ONE-HALF TO ELI HARMON, OF SAME PLACE.

COMBINED PLANTER AND CULTIVATOR.

SPECIFICATION forming part of Letters Patent No. 247,563, dated September 27, 1881.

Application filed March 11, 1881. (No model.)

*To all whom it may concern:*

Be it known that I, THADDEUS HINES, of Tama City, in the county of Tama and State of Iowa, have invented certain new and useful Improvements in Combined Planter and Cultivator; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in a combined corn planter and cultivator, the object thereof being to provide a device of this character which shall combine simplicity of construction and ease of operation with durability and efficacy in use and an adaptability to a wide range of adjustment, as varying soils and circumstances may necessitate.

With these objects in view my invention consists in certain details of construction and combinations of parts, as will be hereinafter described, and pointed out in the claims.

In the accompanying drawings, Figure 1 is a view in side elevation of a combined planter and cultivator constructed in accordance with my invention, one of the wheels of the device being removed to more clearly show the parts. Fig. 2 is a plan view of my invention. Fig. 3 is a view of the under side of the hopper, showing the manner of its operation; and Fig. 4 is a detail view of the adjustable gang-shovel.

Let A represent the rocking planter-frame, pivoted midway of its length to the inner ends of a skeleton-axle, B, said axle supporting the planter-wheels C, gang-couplers D, and upright posts F, connected at their upper extremities by a band, G.

To the inner faces of the upper ends of each of the upright posts a handle, H, is pivotally secured. The forward ends of the two handles, secured as aforesaid, are connected by cross-pieces I, which support the tongue F' of the planter. To the outer end of said tongue a whiffletree, K, is attached.

Connection is made by an adjustable chain, L, between the forward end of the frame A and the frame formed by the handles H and cross-pieces I. Both of these frames are, as hereinbefore described, pivotal, and thus the movement of one will be communicated through the chain L to the other. The object of this is to enable the operator, who grasps the handle H, to regulate the depth of the furrow made by shovel M, attached to the front beam of frame A. It is obvious that, by depressing or elevating the said handle, through chain L the shovel may be raised and lowered at will, and the depth of the furrow thus regulated.

Each end of the whiffletree is provided with triangular draft-irons N, each having their respective corners in connection with the whiffletree in adjustable chain-connection with each end of the skeleton-axle B and to the harness of the animal used with the planter. It is apparent that I can resort to other than an angular draft-iron, as shown in the drawings, and hence would have it understood that I may replace them by other devices fulfilling the same functions without violating the spirit of my invention.

Gang attachments or couplers D are attached to the rear face of each end of the skeleton-axle B, and consist in two tongued plates, each tongue of which is adapted to be received in a slot, O, which laterally bisects the forward end of the beam P of each gang, of which there are two, one being located on each side of the frame A.

I have yet to mention that each of the tongues of both coupling devices D are perforated, as at S, and that the extreme ends of the gang-beams are provided with vertical apertures T.

After the tongues have been received in the slots O in the gang-beams it only remains to make the perforations S and apertures T register, and to lock the two devices with a bolt, U. This a very simple manner of coupling the cultivating-gangs to the planter, and the connection can be as easily severed.

The object in having several tongues is to allow the gangs to be shifted in position to break or cultivate the soil on each side of the central furrow made by the shovel M, as circumstances may require.

The hopper Y, which contains the seed to be planted, is supported in any desirable manner in the frame A, preferably by cross-beams Z, secured to its front and rear sides. The hopper is automatically operated to feed the corn to the furrow in desired quantities and at predetermined intervals apart through mechanism to be hereinafter explained, connecting the hopper to the wheels of the planter. A slide, A', is interposed between the bottom B' and the lower ends of the four side walls of the hopper, and has free reciprocating movement in such adjustment. An aperture, C', in the forward end of said slide establishes open communication between the hopper and the spout D', attached to the front end thereof, and through which the grain falls into the furrow. It is to effect the automatic operation of this slide to open and break said communication between the hopper and the spout that I have invented devices by means of which the rotary motion of the planter-wheels is converted into the reciprocating motion of the slide.

A vertical rod, E', secured to the outside face of one of the longer beams of the frame A, has an arm, F'', secured to its upper end, said arm extending to the inner face of one of the planter-wheels, and adapted to engage with a block, G', located thereon. The lower end of post E' is provided with an arm, H', extending under the hopper, and having its inner end slotted at J' to receive a pin, K', attached to the slide A', and which reciprocates in slot $m'$ in the bottom B' of the hopper.

It is apparent that when, in the revolution of the planter-wheel which operates the feeding mechanism, the block G', located on its inner face, engages with the extremity of the arm F', attached to the upper end of the vertical rod E', the said arm F' will be carried forward, the rod E' will be rotated from right to left, and the slotted end of the lower arm, H', will be moved to the rear, carrying with it the slide A'. Now, whether the slide be adapted to complete communication between the hopper and the spout in its forward or backward motion, it is evident that some power must be arranged to immediately draw it forward again, in order to return the arm F' to a position to be acted upon by the next block on the wheel that is presented; or, if the wheel has completed a revolution by the block that actuated it in the first instance, I accomplish the return of the slide to its normal position by a spring, A'', attached to the forward end thereof and to the forward portion of the frame A. This spring exerts a constant force to draw the slide forward, and will do so just as soon as the influence which overcame it to throw the slide back out of its normal position is removed, which will happen when the block on the wheel releases its engagement with the arm F, as before described.

Besides the function of feeding the corn to the spout, the slide has still another office of dropping the corn in the furrow at regular intervals. This is accomplished by adapting the rear end of the slide to carry a rod, M', arranged parallel therewith and having its forward end attached by flexible connection N' to the upper end of a feed-lever, O', which is pivoted to the rear face of the spout D'. The lower end of the feed-lever is provided with a slide, P', which works in a slot, Q, in the rear face of the spout. It will be apparent by viewing the drawings that when the slide A' is thrown back by the planter-wheel, as before described, it will carry with it the rod M', which will, in turn, draw back the upper end of the feed-lever O' and force the slide P' on the lower end thereof into the spout. When, now, the slide A' is restored to its normal position through the agency of spring A'', the free end of rod M' will be impinged against the upper end of the feed-lever O', which will operate to withdraw the slide P' from the spout and allow the seed therein contained to fall into the furrow, where it is covered with earth by the cultivators, the manner of operation of which will be presently described.

If desired, the slide P', attached to the lower end of the feed-lever O' and operating in the spout, may be done away with and the spout provided with a plane inclining toward its rear face, over an opening in which the lower end of the feed-lever may be arranged to close.

The spacing between the hills may be regulated by varying the adjustment and number of the blocks G' on the wheels.

The adjustment of the feeding devices will vary, of course, with the nature of the soil and the seed to be planted, for, although the device was primarily intended to be used in planting corn, it is not limited to that use alone.

The cultivators, combined with my planter, are not only designed to cultivate the soil on each side of the furrow, but also to cover the corn in the furrow thrown up by shovel M. Said cultivators consist each in a beam, $A^2$, adapted to be coupled with the planter, as before shown, a handle, B'', attached to the inner face of the rear end of the beam, a leg, $C^2$, attached to the outer face of the inner end of the beam, and a shovel, $D^2$, attached to the beam $a^2$ a little to the rear of the center thereof.

The shovel $D^2$ demands particular attention, as it is adapted by novel means to throw the soil which it upturns toward or away from the central furrow formed by the shovel M. This double use is rendered possible by making the shovel-standard in two sections, of which the upper portion, $C^2$, is attached by a bolt, $F^2$, to the plow-beam, and the lower portion, $A^2$, to which the shovel $D^2$ is secured, being traversed longitudinally by a screw-threaded bolt, $J^2$, which passes through an aperture in the upper portion, $C^2$, of the standard. The two parts are held together by a thumb-nut, $A^3$, screwed on that end of the bolt $J^2$ which projects above the upper face of the upper portion of the plow-standard. When the said thumb-screw is screwed down tightly the friction between the two parts will hold them in any relative adjustment to each other which they may be made to assume.

The upper portion, C², will always remain in the same position, as far as the lower portion of the standard is concerned, the adjustment of that portion alone being changed. If, for instance, it is desired to throw the soil toward the central furrow, the thumb-screw is reversed to relieve the friction between the two portions of the standard, and the lower portion is turned until the shovel is given the desired inward inclination. To throw the upturned soil away from the central furrow an outward inclination must be given to the shovel of the cultivator or gang.

To increase the friction between the two portions of the shovel-standards, one portion may be provided with pins $a$ and the other with a corresponding series of depressions, $b$, into which the pins are received. When these pins are employed it will be necessary, in changing the adjustment, to reverse the thumb-screw to such an extent that the lower portion of the standard can drop far enough to release the existing adjustment of the pins, and thus enable the lower portion of the standard to be turned to the right or left to give the shovel an inward or outward inclination, as desired.

The shovels are braced against great strain by a rod, $c$, or an equivalent therefor. One end of said rod is attached to the gang-beam at a point considerably in advance of the shovel, and the other end is made to encircle the screw-bolt through an elongated slot, $d$, in the lower portion of the standard, said slot being at right angles to the length thereof. The elongated shape of the slot allows the shovel to be turned to the right or left, as aforesaid, without interference.

As there are two gangs, one being located each side of the furrow, the shovel of one may be arranged to throw the soil inwardly and cover the corn in the central furrow, while the shovel of the other may be adjusted to throw the soil upturned by it away from said furrow.

If desired, each gang may be provided with more than one adjustable shovel.

Hooks attached to the planter-frame A at each side of the rear thereof are designed to hold the gangs out of contact of the soil when their use is desired to be temporarily arrested.

Having fully described my invention, what I claim as new, and desire to secure by Letters Patent, is—

1. In a combined planter and cultivator, the combination, with a skeleton-axle supporting a rocking frame having a shovel attached thereto, of handles pivotally secured to upright posts erected on the axle, beams connecting the forward ends of the handles, a tongue secured to the cross-beams, and triangular draft-irons pivoted at their upper ends to the opposite ends of a whiffletree attached to said beam, substantially as set forth.

2. In a combined planter and cultivator, the combination, with a skeleton-axle supporting a rocking frame and a shovel attached to the forward end of said frame, of handles pivotally secured to upright posts erected on the axle, beams connecting the forward ends of the handles, and a tongue secured to the said cross-beams, substantially as set forth.

3. In a combined planter and cultivator, the combination, with a skeleton-axle supporting a rocking frame and a shovel attached to the forward end of said frame, of pivotal handles secured to upright posts erected on the skeleton axle, a cross-beam connecting the forward ends of the handles, and adjustable connection between the forward end of the rocking frame and the cross-beam of the handles, substantially as set forth.

4. In a combined planter and cultivator, the combination, with a skeleton-axle supporting a rocking frame and a shovel, of pivotal handles secured to posts erected on the axle, cross-beams connecting the forward ends of the handles, a tongue fixed to the said cross-beams, and adjustable connection between the rocking frame and pivotal handles, substantially as set forth.

5. In a combined planter and cultivator, a gang-shovel the standard of which is made of two parts—an upper and lower—the same being held together by an iron rod traversing both longitudinally, and which projects beyond the upper part of the standard, and is then held from movement by a thumb-screw, substantially as set forth.

6. In a combined planter and cultivator, the combination, with a gang, of a shovel the standard whereof is made in two parts, the upper of which is attached to the gang-beam, of an iron rod traversing both of the standard-pieces longitudinally, and a brace-rod attached to the gang forward of the shovel-standard, and having its inner end attached to the lower portion of the standard, substantially as set forth.

7. In a combined planter and cultivator, the combination, with the gang-shovel, the lower portion whereof is laterally slotted, of a brace-rod attached to the gang-beam forward of the shovel-standard and to the rod that traverses the standard through a slot in the lower portion thereof, substantially as set forth.

In testimony that I claim the foregoing I have hereunto set my hand this 1st day of February, 1881.

THADDEUS HINES.

Witnesses:
CHARLES MADER,
FRANK BENNETT.